United States Patent
Gruber et al.

(10) Patent No.: US 10,396,496 B2
(45) Date of Patent: Aug. 27, 2019

(54) CONNECTOR

(71) Applicant: Rosenberger Hochfrequenztechnik GmbH & Co. KG, Fridolfing (DE)

(72) Inventors: Andreas Gruber, Laufen (DE); Christian Dandl, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 16/001,747

(22) Filed: Jun. 6, 2018

(65) Prior Publication Data

US 2018/0358743 A1  Dec. 13, 2018

(30) Foreign Application Priority Data

Jun. 8, 2017  (EP) .................................. 17174879

(51) Int. Cl.
  *H01R 13/62* (2006.01)
  *H01R 13/629* (2006.01)
  (Continued)

(52) U.S. Cl.
  CPC ............ *H01R 13/629* (2013.01); *F16L 25/01* (2013.01); *F16L 37/092* (2013.01);
  (Continued)

(58) Field of Classification Search
  CPC .. H01R 13/6277; H01R 24/40; H01R 13/629; F16L 37/0915; F16L 37/0086; F16L 37/0982; F16L 37/0985; F16L 37/22
  (Continued)

(56) References Cited

U.S. PATENT DOCUMENTS 4,366,945 A * 1/1983 Blauenstein ............ F16L 37/22
  251/149.6
5,607,190 A * 3/1997 Exandier ............. F16L 37/0985
  285/308
(Continued)

FOREIGN PATENT DOCUMENTS

DE    1439852 A1   5/1996
EP    2565990 A1   3/2013
(Continued)

OTHER PUBLICATIONS

Machine English translation of European Search Report issued in European Application No. 17174879.1-1801 dated Dec. 13, 2017.
(Continued)

*Primary Examiner* — Jean F Duverne
(74) *Attorney, Agent, or Firm* — Roberts Mlotkowski; Safran Cole & Calderon, P.C.

(57) ABSTRACT

The present invention relates to a connector, in particular plug connector, for the releasable connection of two lines along a connector axis, having a line, a connection mechanism which has a sleeve and a drag element, and a holding element for holding a counterpart connector to be connected, wherein the sleeve is displaceable over the drag element, the holding element and over the line, wherein the drag element and the sleeve are each displaceable between a first position and a second position along the connector axis and the sleeve is designed to actuate the drag element, by means of an axial displacement of the sleeve, in order to connect the connector to, or release the connector from, a counterpart connector.

17 Claims, 5 Drawing Sheets

(51) Int. Cl.
*H01R 13/627* (2006.01)
*F16L 37/091* (2006.01)
*H01R 24/40* (2011.01)
*F16L 25/01* (2006.01)
*F16L 37/092* (2006.01)

(52) U.S. Cl.
CPC ...... *F16L 37/0915* (2016.05); *H01R 13/6277* (2013.01); *H01R 24/40* (2013.01)

(58) Field of Classification Search
USPC ........................................................ 439/310
See application file for complete search history.

(56) References Cited

U.S. PATENT DOCUMENTS

| | | | | |
|---|---|---|---|---|
| 5,649,724 A * | 7/1997 | Wiethorn | ............ | F16L 37/0985 285/320 |
| 5,711,549 A * | 1/1998 | Beans | .................... | F16L 13/14 285/305 |
| 5,890,749 A * | 4/1999 | Fukaya | ............... | F16L 37/0985 285/308 |
| 6,173,998 B1 * | 1/2001 | Bock | ................... | F16L 37/0985 285/319 |
| 6,199,920 B1 * | 3/2001 | Neustadtl | ............ | F16L 25/0045 285/319 |
| 6,328,344 B1 * | 12/2001 | Tozaki | ................ | F16L 37/0985 285/120.1 |
| 8,632,052 B2 * | 1/2014 | Liu | ......................... | F16L 37/40 251/149.6 |
| 9,523,453 B2 * | 12/2016 | Arnold | ................ | F16L 37/0982 |
| 9,890,887 B2 * | 2/2018 | Barthel | ............... | F16L 37/0985 |
| 2006/0105628 A1 | 5/2006 | Montena | | |
| 2007/0120362 A1 * | 5/2007 | Poder | .................. | F16L 37/0985 285/314 |
| 2007/0275590 A1 | 11/2007 | Cheng | | |
| 2012/0119485 A1 * | 5/2012 | Cichorek | ............ | F16L 37/0982 285/81 |
| 2012/0319401 A1 | 12/2012 | Wang | | |
| 2017/0018875 A1 | 1/2017 | Bauer et al. | | |

FOREIGN PATENT DOCUMENTS

| | | |
|---|---|---|
| EP | 2770587 A1 | 8/2014 |
| EP | 2142951 B1 | 4/2015 |
| EP | 2978079 A1 | 1/2016 |

OTHER PUBLICATIONS

Machine English translation of European Communication under Article 94(3) issued in European Application No. 17174879.1-1201 dated May 28, 2018.

* cited by examiner

CONNECTOR

CROSS REFERENCE TO RELATED APPLICATIONS

The present application claims priority to European Patent Application No. 17174879.1 filed on Jun. 8, 2017, the contents of this application being incorporated herein by reference in their entirety.

FIELD

The present invention relates to connectors for connecting two lines, for example plug connectors, screw connectors or the like. The invention relates to both electrical connectors and to purely mechanical connectors, for example fluid connectors.

BACKGROUND

DE 4439852 A1 presents a locking mechanism for an RF plug connector. The principle of this prior art can also, as per EP 2 142 951 B1, be applied to optical plug connectors.

Accordingly, locking mechanisms for connecting a connector to a counterpart connector are known.

A disadvantage of such locking mechanisms is that, owing to the locking mechanism, connectors are often compatible only with a particular counterpart connector. Furthermore, the holding force of a connection between a connector and a counterpart connector cannot be individually adjusted, but rather is dependent on the design of the locking mechanism.

This is a situation which it is sought to improve.

SUMMARY

Against this background, it is the object of the present invention to specify an individually handlable connection system.

According to the invention, said object is achieved by means of a connector having the features of Patent claim 1.

Accordingly, the following is provided:

a connector for the releasable connection of two lines along a connector axis, having a line, a connection mechanism which has a sleeve and a drag element, and a holding element for holding a counterpart connector to be connected, wherein the sleeve is displaceable over the drag element, the holding element and over the line, wherein the drag element and the sleeve are each displaceable between a first position and a second position along the connector axis and the sleeve is designed to actuate the drag element, by an axial displacement of the sleeve, in order to connect the connector to, or release the connector from, a counterpart connector.

The concept on which the present invention is based consists in providing a tolerance compensation facility of a connector by means of a variable length of an actuation travel of a connection mechanism. In this regard, the invention makes a distinction between the actuation travel of the sleeve and the actuation travel of the drag element.

In this way, it is possible to realize a compensation facility for particularly large tolerances. Through the improvement of the tolerance compensation, rejections in the connector manufacturing process can be reduced, and the compatibility of a connector can be improved.

The present invention provides that the length of the actuation travel of the sleeve is longer the smaller the outer diameter is of a counterpart connector to be connected.

Advantageous embodiments and refinements will emerge from the further subclaims and from the description with reference to the figures of the drawing.

It is self-evident that the features mentioned above and the features yet to be discussed below may be used not only in the respectively specified combination but also in other combinations or individually without departing from the scope of the present invention.

It is particularly advantageous if the actuation travel of the drag element is defined by a force with which the sleeve acts on the drag element, that is to say the actuation travel extends from an initial position of the sleeve to a position at which the sleeve transmits a particular radial force to the drag element. At the point at which this force is exceeded, the actuation travel ends, and it may be provided that the sleeve is displaced further as far as a particular point without actuating the drag element.

In an embodiment of the invention, the lines are formed as electrical lines, in particular as cables, or as pipelines, in particular as fluid lines. The principle of the invention is applicable to all types of connectors that were conventional on the filing date, in particular to electrical plug connectors, for example coaxial plug connectors, HV plug connectors, optical plug connectors, to fluid connectors, for example on hydrants or garden hoses.

In an embodiment of the invention, the sleeve, the holding element and/or the drag element are manufactured from electrically conductive material. This is advantageous in particular for electrical plug connectors, because the electromagnetic shielding can be improved in this way.

In particular, it may be expedient for the geometrical shape of the connection mechanism, that is to say the sleeve, the drag element and/or the holding element, to be adapted in a manner dependent on the frequency of a signal to be transmitted.

In an embodiment of the invention, the sleeve is movable between the first position, the second position and a third position, wherein the second position is situated between the first position and the third position and the second position forms an end position for the drag element. Accordingly, the drag element cannot be displaced beyond the second position, that is to say cannot be displaced between the second and the third position.

It is thus possible for the second position to be defined in a manner dependent on a force that is imparted to the drag element by the sleeve, wherein the actuation travel of the sleeve between the first and third positions remains constant.

This is particularly advantageous if the connection mechanism is operated not manually but by a machine, by a robot or by a controller.

In this way, the force to be imparted for the connection of a connector to a counterpart connector can be finely adjusted by structural means.

Accordingly, it may be provided that the connection between the connector and a counterpart connector is fully produced already when the drag element is situated in the second position.

If the connector is actuated not manually but by a machine, it is desirable for the length of the actuation travel of the sleeve to be independent of the force for the connection, and in particular to be equal for every connection cycle. This may be achieved by virtue of the actuation travel of the sleeve being configured such that, in all situations, it is longer than the force-dependent actuation travel of the drag element.

Accordingly, a machine or a user can move the sleeve between the second and the third position despite the connection already having been produced by means of the connection mechanism. In this way, the connection process can be simplified, because no means for detecting the attainment of the second position are necessary; it must rather merely be ensured that the second position has been reached when the sleeve is situated in its third position.

Even in the case of human operators, this reduces the error rate of erroneous connections.

In an embodiment of the invention, the sleeve and/or the drag element has a detent means, such that the sleeve is locked to the drag element between the first and the second position and the locking is released in the second position.

In this way, it is ensured that the drag element moves together with the sleeve when the sleeve is locked to the drag element. It is thus sufficient for a user or a machine to actuate the sleeve rather than actuating the sleeve and the drag element.

In an embodiment of the invention, the force with which the drag element is locked to the sleeve is adjustable by means of the position of a detent means of the sleeve. For example, in the sleeve, there may be formed a detent groove which is delimited by a displaceable edge. By means of a displacement of the edge, the geometry of the detent groove can be adjusted, which in turn has an effect on the force with which the drag element is locked to the sleeve.

In an embodiment of the invention, the second position, in which the locking between the drag element and the sleeve is released, is defined in a manner dependent on a force that is transmitted by the sleeve to the drag element. In this way, the detent connection between the sleeve and the drag element is released as soon as a force that is transmitted from the sleeve to the drag element exceeds a particular threshold value.

If it is provided that the actuation travel of the sleeve is longer than the actuation travel of the drag element, a user must, when actuating the connection mechanism, briefly impart a relatively high force in order to release the locking between the sleeve and the drag element. This provides the user with haptic feedback regarding the connection process.

In an embodiment of the invention, the holding element is formed as a spring which is deformable in a radial direction.

In particular, provision may be made for contact surfaces of the sleeve, of the drag element or of the holding element to be formed obliquely relative to the sleeve, relative to the drag element or relative to the holding element in order to adjust the force that has to be imparted for the connection process.

In an embodiment of the invention, the spring is formed as a spring cage with spring tabs. In this way, the force to be imparted for the connection of the connector to a counterpart connector is extremely low, because a spring cage with spring tabs is radially easily deformable and nevertheless ensures an adequate holding force.

In an embodiment of the invention, the spring tabs of the spring cage are curved in a radial direction such that the spring tabs make contact with the drag element at an outer region of the spring tabs and make contact with a counterpart connector in a central region of the spring tabs.

In this way, the service life of the connector according to the invention or counterpart connector can be lengthened, because the edges of the spring tabs do not rub against the counterpart connector, but rather the counterpart connector is held by a central contact surface of the spring tabs.

In an embodiment of the invention, the connection mechanism is designed to clamp and/or lock the connector to a counterpart connector. Tests have shown that an adequate holding force is ensured by means of clamping alone.

In an embodiment of the invention, the spring has a detent means which is designed to lock with the counterpart connector. Thus, the holding force of the connection between the connector and the counterpart connector is further increased.

In an embodiment of the invention, the detent means is formed as a hook-shaped recess of the spring tab. Said detent means ensures a simple but at the same time secure locking action.

In an embodiment of the invention, the spring tabs widen radially in an interface-side region. In this way, a centring aid for centring the counterpart connector in the connector is ensured.

The above embodiments and refinements may be combined with one another as desired where expedient. Further possible embodiments, refinements and implementations of the invention also encompass combinations, which have not been explicitly mentioned, of features of the invention described above or below with regard to the exemplary embodiments. In particular, here, a person skilled in the art will also add individual aspects as improvements or enhancements to the respective basic form of the present invention.

BRIEF DESCRIPTION OF THE DRAWINGS

The present invention will be discussed in more detail below on the basis of the exemplary embodiments detailed in the schematic figures of the drawing, in which.

Figure 1:
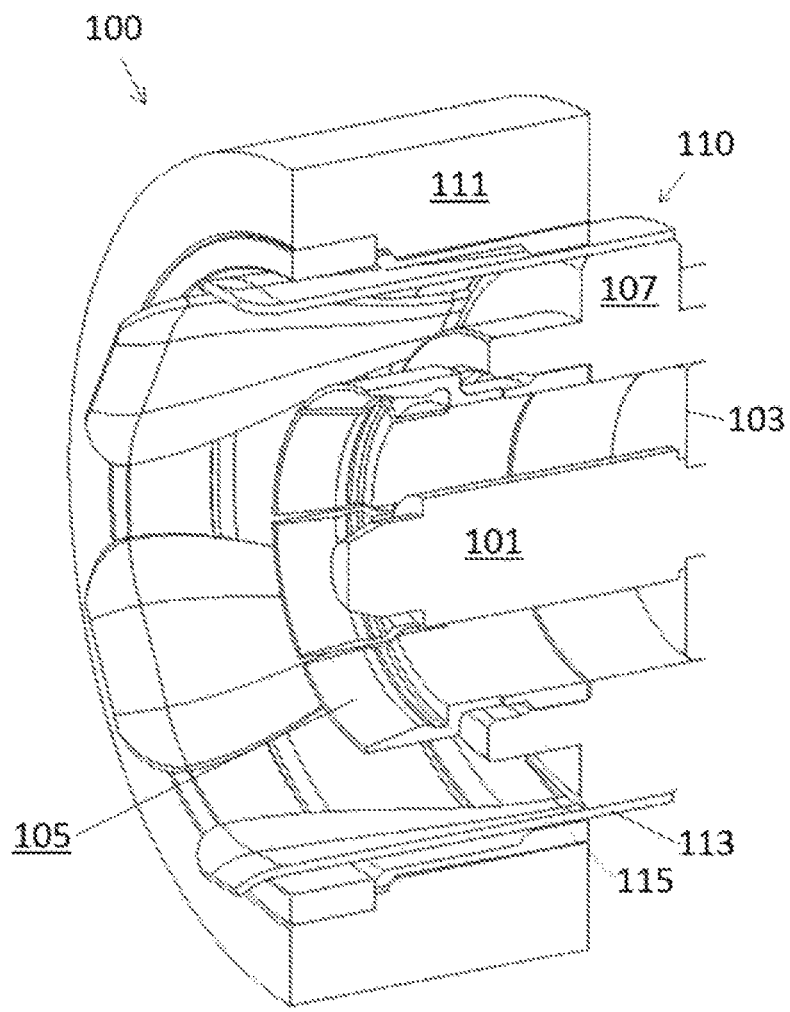
FIG. 1 shows a schematic sectional view of an electrical connector according to an embodiment of the invention.

The appended figures of the drawing are intended to impart further understanding of the embodiments of the invention. They illustrate embodiments and serve, in conjunction with the description, for the explanation of principles and concepts of the invention. Other embodiments and many of the stated advantages will emerge with regard to the drawings. The elements of the drawings are not necessarily shown to scale relative to one another.

In the figures of the drawing, elements, features and components which are identical, functionally identical and of identical action are in each case denoted by the same reference designations unless stated otherwise.

A joint and overall description of the figures will be given below.

DETAILED DESCRIPTION

FIG. 1 shows a schematic sectional view of a connector 100 according to the invention, which is formed as a coaxial plug connector. The connector 100 has an inner conductor 101, an insulating part 103 and an outer conductor 105. The insulating part 103 spaces the outer conductor 105 apart from the inner conductor 101. The outer conductor 105 has multiple spring tabs and, in an interface-side region, forms a step or diameter step.

The electrical arrangement with the inner conductor 101, the insulating part 103 and the outer conductor 105 is arranged in a housing 107. The connection mechanism 110 is fastened to the housing 107. It may alternatively be provided that the connection mechanism 110 is integrated as part of a housing.

The connection mechanism 110 comprises a sleeve 111, a drag element 115 and a spring cage 113. The sleeve 111 surrounds the drag element 115. The drag element 115 surrounds the spring cage 113. The sleeve 111 is connected to the drag element 115 such that the drag element 115 is displaceable along the longitudinal axis by means of a movement of the sleeve 111.

Owing to an inwardly directed contour of the drag element 115 and/or an outwardly directed preload of the spring cage 113, the spring cage 113 and the drag element 115 are pressed lightly against one another.

Figure 2:
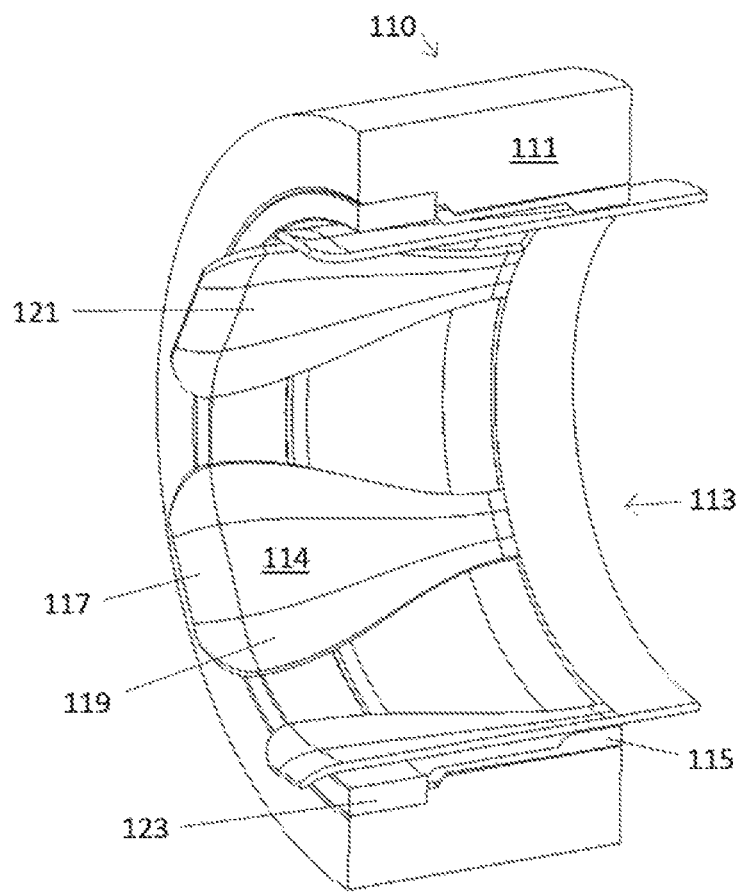
FIG. 2 shows a schematic sectional view of a connection mechanism according to the invention according to an embodiment of the invention.

FIG. 2 shows a perspective sectional view of the connection mechanism 110 as per FIG. 1. The spring cage 113 comprises multiple spring tabs 114 with a curved contour. The spring tabs 114 comprise an interface-side front region 117, in which the spring tabs open outward. In this way, a funnel-shaped catching region is formed which facilitates the connection or plugging-together of a connector with a counterpart connector. Furthermore, the spring tabs 114 comprise a central region 121 and a lateral region 119.

The lateral region 119 is curved in a radial direction such that the side edges of the spring tabs 114 do not rub against the drag element 115 but rather make contact with, or hold, a connector or counterpart connector, which is situated to the inside of the spring cage 113, when the connection mechanism 110 is situated in a corresponding position. The central region 121 of the spring tabs 114 is curved in a radial direction such that the central region 121 makes contact with the drag element 115, or possibly electrically contacts the latter if the locking mechanism 110 is part of an electrical path.

Figure 3:
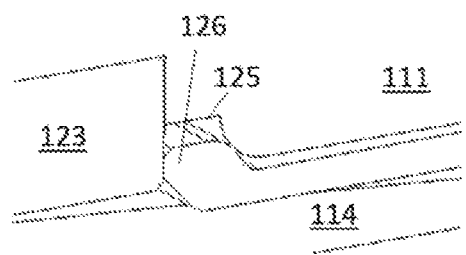
FIG. 3 shows an extract as per FIG. 2.

FIG. 3 shows an extract as a detail view as per FIG. 2. The sleeve 111 is of 2-part form and comprises a main body and a ring 123. The ring 123 forms, together with the main body of the sleeve 111, a groove 125 which is designed to lock with a detent lug 126 of the drag element 115. By virtue of the ring 123 being inserted into the sleeve 111 in an installation step, the groove 125 can be configured in an application-specific manner with regard to its contour and material selection.

As indicated in FIG. 3, the ring 123 may be designed to be displaceable. For example, a thread may be provided between the ring 123 and the main body of the sleeve for the purposes of adjusting the position of the ring 123. It is self-evident that adjustment facilities other than a thread, for example using magnetic materials, are also conceivable. The width of the groove 126 can thus be adjusted. With a correspondingly designed geometry of the detent lug 126, it is thus possible to adjust the force with which the detent lug 126 engages with detent action in the detent groove 125.

Alternatively, the sleeve 111 may also be formed in one piece with a ring-shaped incision for a groove. In this way, the production process can be simplified in relation to a two-part sleeve.

Figure 4:
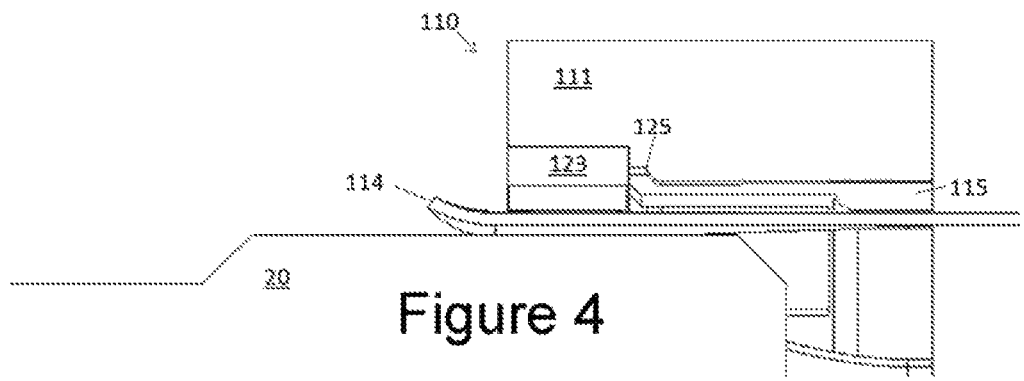
FIG. 4 shows a connector according to the invention as per an embodiment of the invention in a first position.
Figure 5:
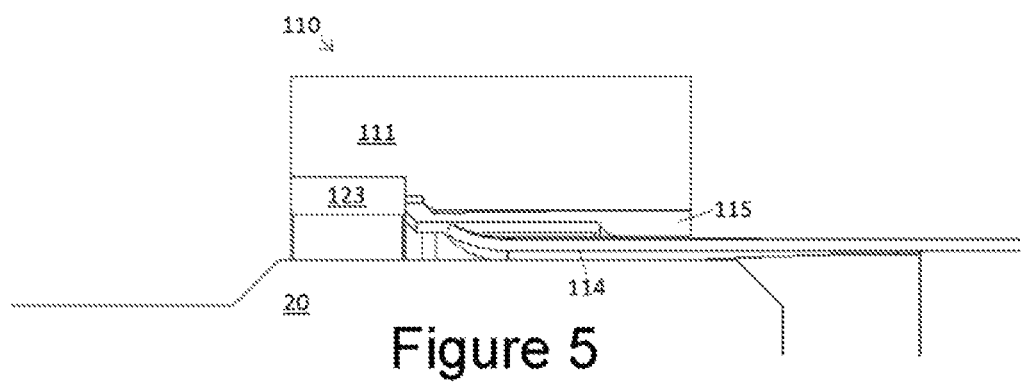
FIG. 5 shows a connector according to the invention as per an embodiment of the invention in a second position.
Figure 6:
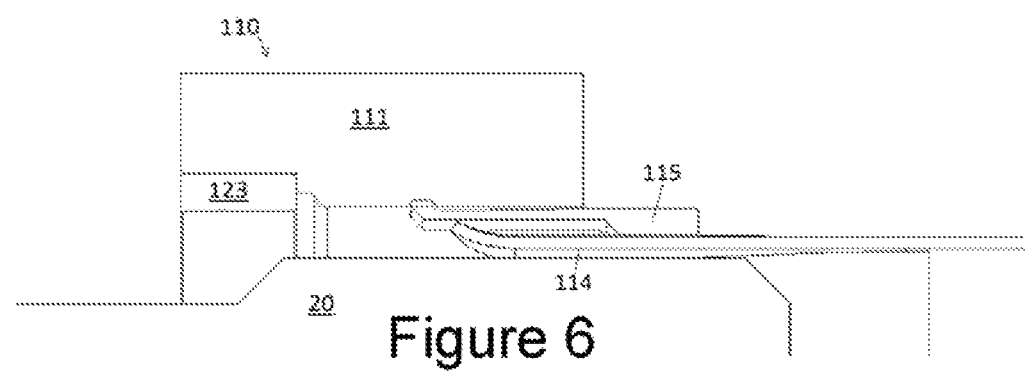
FIG. 6 shows a connector according to the invention as per an embodiment of the invention in a third position.

FIGS. 4-5 show the connection mechanism 110 according to the invention in a first position (FIG. 4), in a second position (FIG. 5) and in a third position (FIG. 6).

FIG. 4 shows the connection mechanism 110 in an initial position, in which the connection mechanism is not actuated. In the initial position, the sleeve 111 is locked to the drag element 115 by virtue of the drag element 115 being situated in the groove 125. The rear ends of the sleeve 111 and of the drag element 115 terminate flush with one another in the initial position. The spring cage 113 with the spring tabs 114 is arranged to the inside of the drag element 115. A rear stepped region of the drag element 115 makes contact with a rear region of the spring tabs 114. The spring tabs 114 are preloaded outward slightly without making contact with the drag element 115 over the further course thereof in the direction of the interface. The drag element 115 is preloaded inwards slightly in a radial direction, such that a small gap is formed between the sleeve 111 and the drag element 115.

A counterpart connector 20 is inserted into the spring cage 113 and is contacted by the side edges of the spring tabs 114.

FIG. 5 shows the connection mechanism 110 in a middle position after the actuation thereof. In FIG. 5, the sleeve 111 has been pulled forward by a user or by a machine in relation to FIG. 4. Owing to the connection between the sleeve 111 and the drag element 115 by means of the groove 125, the drag element 115 has been carried along or dragged forward by the axial movement of the sleeve. Owing to the outward preload of the spring tabs 114, these are pushed inward by the ring-shaped region of the drag element 115 in order to increase the holding force of the spring tabs 114 on the counterpart connector 20.

In the embodiment as per FIGS. 4-6, it is provided that the full connection force is realized already in the second position as per FIG. 5. Alternative embodiments, in which the connection force increases further after the second position as per FIG. 6, may likewise be realized.

FIG. 6 shows an end position of the connection mechanism 110. The drag element 105 has moved no further in the direction of the interface in relation to FIG. 5. In this regard, an upper force threshold can be defined at which the drag element can be displaced no further. Alternatively, a fixed position that cannot be overshot by the drag element may be defined.

The sleeve 111 has been displaced further forward in relation to FIG. 5, such that the drag element 115 is no longer locked to the sleeve 111 by means of the groove 125. To lift the detent lug 126 out of the groove 125, it is briefly necessary for more force to be imparted by a user. This additional expenditure of force signals to the user that the drag element 115 is no longer being carried along by the sleeve 111.

In the position as per FIG. 6, a relatively high contact force exists between the sleeve 111 and the drag element 115, because the detent lug 126 presses directly against the main body of the sleeve.

In FIGS. 4-6, no additional locking is provided, because the clamping between the sleeve 111, the drag element 115, the spring tabs 114 and the counterpart connector 20 already ensures an adequate holding force.

However, if locking is necessary owing to a specific use, this may be readily added.

Figure 7:
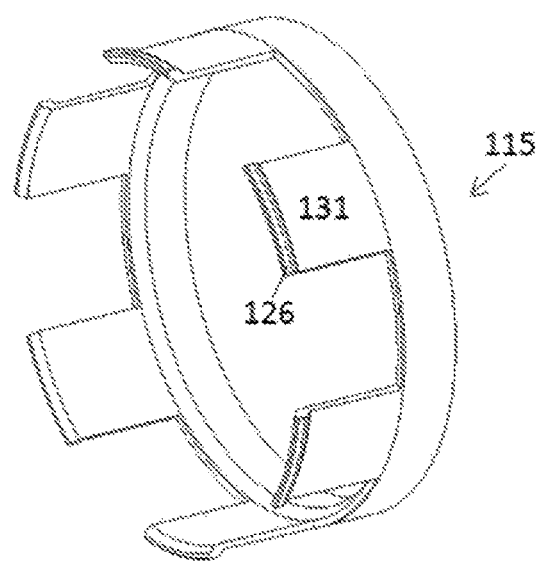
FIG. 7 shows a detail view of a drag element according to an embodiment of the invention.

FIG. 7 shows a drag element according to the invention with multiple spring tabs 131. The detent lug 126 is formed on the front ends of the spring tabs 131. The number and width of the spring tabs 131 is to be selected in a manner dependent on the stiffness or the disengagement force of the drag element 115.

Figure 8:
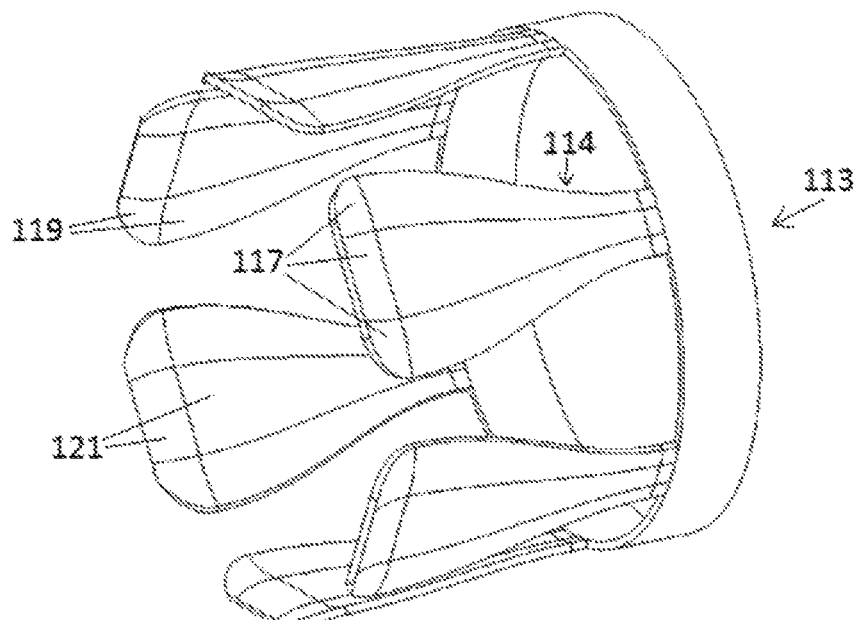
FIG. 8 shows a detail view of a spring cage as per an embodiment of the invention.

FIG. 8 shows a holding element according to the invention which is formed as a spring cage 113. The spring cage 113 comprises multiple tabs 114 which are formed integrally on a ring.

Figure 9:
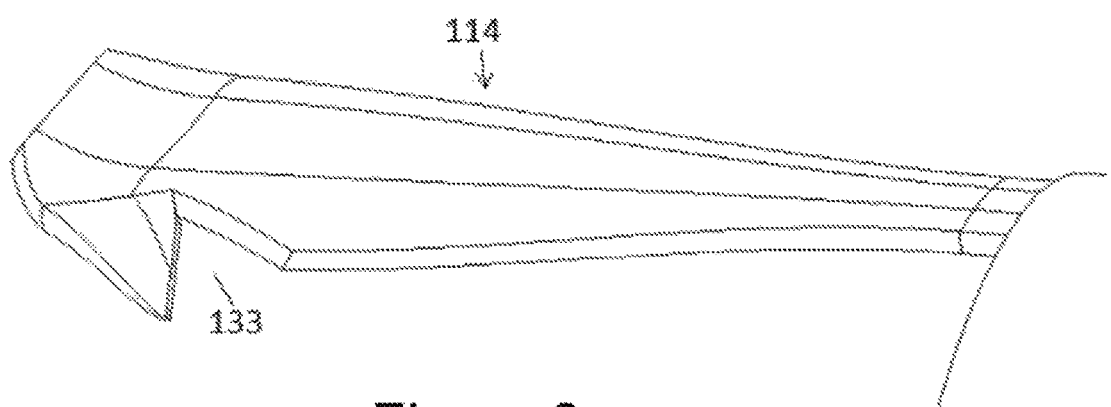
FIG. 9 shows a detailed view of a spring tab as per an embodiment of the invention.

FIG. 9 shows a further embodiment of a spring cage 113 according to the invention, the spring tabs of which have detent hooks 133 in the outer regions 119. The detent hooks 133 form detent means, such that the spring cage 113 can lock with a further component. It may be provided that the detent hooks lock with a part of the counterpart connector 20 or with some other component.

A detent hook 133 can be manufactured by virtue of an incision being made in the spring tab 114 in the outer region 119, and the incision being curved such that a detent hook 133 is formed.

Although the present invention has been described in full above on the basis of preferred exemplary embodiments, the invention is not restricted to these exemplary embodiments, but rather may be modified in a wide variety of ways.

LIST OF REFERENCE DESIGNATIONS

100 Electrical connector
101 Inner conductor
103 Insulating part
105 Outer conductor
107 Housing
110 Connection mechanism
111 Sleeve
113 Spring cage
114 Spring tab
115 Drag element
117 Front region
119 Outer region
121 Central region
123 Detent means, stop
125 Detent means, groove
126 Detent means, detent lug
131 Spring tab
133 Detent hook

The invention claimed is:

1. A connector for the releasable connection of two lines along a connector axis, having
   a line,
   a connection mechanism which has a sleeve and a drag element having multiple spring tabs, each having a detent lug on one end thereof, and
   a holding element for holding a counterpart connector to be connected,
   wherein the sleeve is displaceable over the drag element, the holding element and over the line,
   wherein the drag element and the sleeve are each displaceable between a first position and a second position along the connector axis and the sleeve is designed to displace the drag element, by an axial displacement of the sleeve, between the first position and the second position in order to connect the connector to, or release the connector from, a counterpart connector.

2. A connector according to claim 1, wherein the lines are formed as electrical lines, in particular as cables, or as pipelines, in particular as fluid lines.

3. A connector according to claim 1, wherein the sleeve, the holding element and/or the drag element are manufactured from electrically conductive material.

4. A connector according to claim 1, wherein the sleeve is movable between the first position, the second position and a third position which forms a stop for the sleeve, wherein the second position is situated between the first position and the third position, and the second position forms an end position for the drag element.

5. A connector according to claim 4, wherein the sleeve and/or the drag element have a detent, such that the sleeve is locked to the drag element between the first and the second position and the locking is released in the second position.

6. A connector according to claim 5, wherein the force with which the drag element is locked to the sleeve is adjustable by the position of the detent of the sleeve.

7. A connector according to claim 5, wherein the second position, in which the locking between the drag element and the sleeve is released, is defined in a manner dependent on a force that is transmitted from the sleeve to the drag element.

8. A connector according to claim 6, wherein the second position, in which the locking between the drag element and the sleeve is released, is defined in a manner dependent on a force that is transmitted from the sleeve to the drag element.

9. A connector according to claim 8, wherein the second position between the first position and the third position varies.

10. A connector according to claim 1, wherein the holding element is formed as a spring which is deformable in a radial direction.

11. A connector according to claim 10, wherein the spring is formed as a spring cage with spring tabs.

12. A connector according to claim 11, wherein the spring tabs of the spring cage are curved in a radial direction such that the spring tabs make contact with the drag element at an outer region of the spring tabs and make contact with a counterpart connector in a central region of the spring tabs.

13. A connector according to claim 1, wherein the connection mechanism is designed to clamp and/or lock the connector to a counterpart connector.

14. A connector according to claim 13, wherein the spring has a detent which is designed to lock with the counterpart connector.

15. A connector according to claim 14, wherein the detent is formed as a hook-shaped recess of the spring tab.

16. A connector according to claim 11, wherein the spring tabs widen radially in an interface-side region.

17. A connector according to claim 1, wherein the sleeve has an annular groove into which the detent lugs of the drag element lock.

* * * * *